US008176278B2

(12) United States Patent
Nishiguchi et al.

(10) Patent No.: US 8,176,278 B2
(45) Date of Patent: May 8, 2012

(54) INFORMATION PROCESSING APPARATUS, INFORMATION PROCESSING METHOD AND RECORD MEDIUM

(75) Inventors: Naoki Nishiguchi, Kawasaki (JP); Jun Kawai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1290 days.

(21) Appl. No.: 11/210,658

(22) Filed: Aug. 25, 2005

(65) Prior Publication Data

US 2006/0265562 A1 Nov. 23, 2006

(30) Foreign Application Priority Data

May 19, 2005 (JP) ................................. 2005-146992

(51) Int. Cl.
  *G06F 13/00* (2006.01)
  *G06F 13/28* (2006.01)
(52) U.S. Cl. ............ 711/163; 712/244; 713/2; 713/187; 713/188; 726/26; 726/34
(58) Field of Classification Search ................... 726/22, 726/26, 27, 34; 713/1, 2, 163, 187, 188; 714/31, 38, 54; 711/100; 710/28; 712/244
See application file for complete search history.

(56) References Cited

U.S. PATENT DOCUMENTS

| 5,093,780 | A | * | 3/1992 | Sunahara ...................... 709/213 |
| 5,173,903 | A | * | 12/1992 | Zelley et al. .................... 714/30 |
| 5,493,649 | A | * | 2/1996 | Slivka et al. .................... 714/48 |
| 5,850,559 | A | * | 12/1998 | Angelo et al. ................. 713/320 |
| 5,944,821 | A | * | 8/1999 | Angelo ............................ 726/22 |
| 6,029,222 | A | * | 2/2000 | Kamiya ......................... 710/262 |
| 6,247,131 | B1 | * | 6/2001 | Kotani et al. .................... 726/26 |
| 6,510,502 | B1 | * | 1/2003 | Shimizu ......................... 711/164 |
| 6,738,892 | B1 | * | 5/2004 | Coon et al. ....................... 712/24 |
| 6,754,548 | B1 | * | 6/2004 | Yoshii et al. .................... 700/94 |
| 6,816,964 | B1 | * | 11/2004 | Suzuki et al. .................... 713/2 |
| 6,952,822 | B2 | * | 10/2005 | Shiobara et al. ............. 717/168 |
| 7,201,662 | B2 | * | 4/2007 | LeMay et al. ................... 463/43 |
| 7,213,117 | B2 | * | 5/2007 | Wakabayashi et al. ....... 711/163 |
| 7,313,704 | B2 | * | 12/2007 | Kashiwada .................... 713/191 |
| 7,373,670 | B2 | * | 5/2008 | Mimatsu et al. ................. 726/27 |
| 7,383,168 | B2 | * | 6/2008 | Mukherjee et al. ............. 703/22 |
| 7,386,714 | B2 | * | 6/2008 | Takatori et al. ................... 713/2 |

(Continued)

FOREIGN PATENT DOCUMENTS

JP 10-333902 12/1998

(Continued)

*Primary Examiner* — Nasser Goodarzi
*Assistant Examiner* — Shanto M Abedin
(74) *Attorney, Agent, or Firm* — Kratz, Quintos & Hanson, LLP

(57) ABSTRACT

Provided is information processing apparatus, information processing method and a record medium, which can prevent occurrence of manipulation, in a case of accessing a memory, without consuming the access band of the memory. A main-processing unit, a sub-processing unit and a memory for loading a program are provided and process limit information stored in the memory is stored in storing means. The sub-processing unit judges whether a program to be executed is manipulated or not, and loads a program to be executed in the memory in case that the program is not manipulated. The sub-processing unit refers to the process limit information before execution of a program, and not permits execution of the program of the main-processing unit in case that a process by the main-processing unit for information stored in the memory accords with a process included in the process limit information.

16 Claims, 8 Drawing Sheets

U.S. PATENT DOCUMENTS

| | | | |
|---|---|---|---|
| 7,392,427 B2 * | 6/2008 | Ikezawa | 714/13 |
| 7,523,229 B2 * | 4/2009 | Hatakeyama | 710/28 |
| 7,698,744 B2 * | 4/2010 | Fanton et al. | 726/27 |
| 2001/0027524 A1 * | 10/2001 | Krauter et al. | 713/200 |
| 2002/0152428 A1 * | 10/2002 | James et al. | 714/42 |
| 2003/0009687 A1 * | 1/2003 | Ferchau et al. | 713/200 |
| 2003/0018873 A1 * | 1/2003 | Colpo et al. | 711/202 |
| 2004/0059934 A1 * | 3/2004 | Kohiyama et al. | 713/200 |
| 2004/0093505 A1 * | 5/2004 | Hatakeyama et al. | 713/189 |
| 2004/0133801 A1 * | 7/2004 | Pastorelli et al. | 713/200 |
| 2004/0236788 A1 * | 11/2004 | Sato et al. | 707/104.1 |
| 2005/0071668 A1 * | 3/2005 | Yoon et al. | 713/200 |
| 2005/0086447 A1 * | 4/2005 | Miyamoto et al. | 711/163 |
| 2005/0114693 A1 * | 5/2005 | Mimatsu et al. | 713/200 |
| 2005/0193217 A1 * | 9/2005 | Case et al. | 713/200 |
| 2005/0223136 A1 * | 10/2005 | Tanaka et al. | 710/22 |
| 2006/0294513 A1 * | 12/2006 | Bar-El et al. | 717/168 |

FOREIGN PATENT DOCUMENTS

| | | |
|---|---|---|
| JP | 2001-325150 | 11/2001 |
| JP | 2004-280284 | 10/2004 |

* cited by examiner

F I G. 2
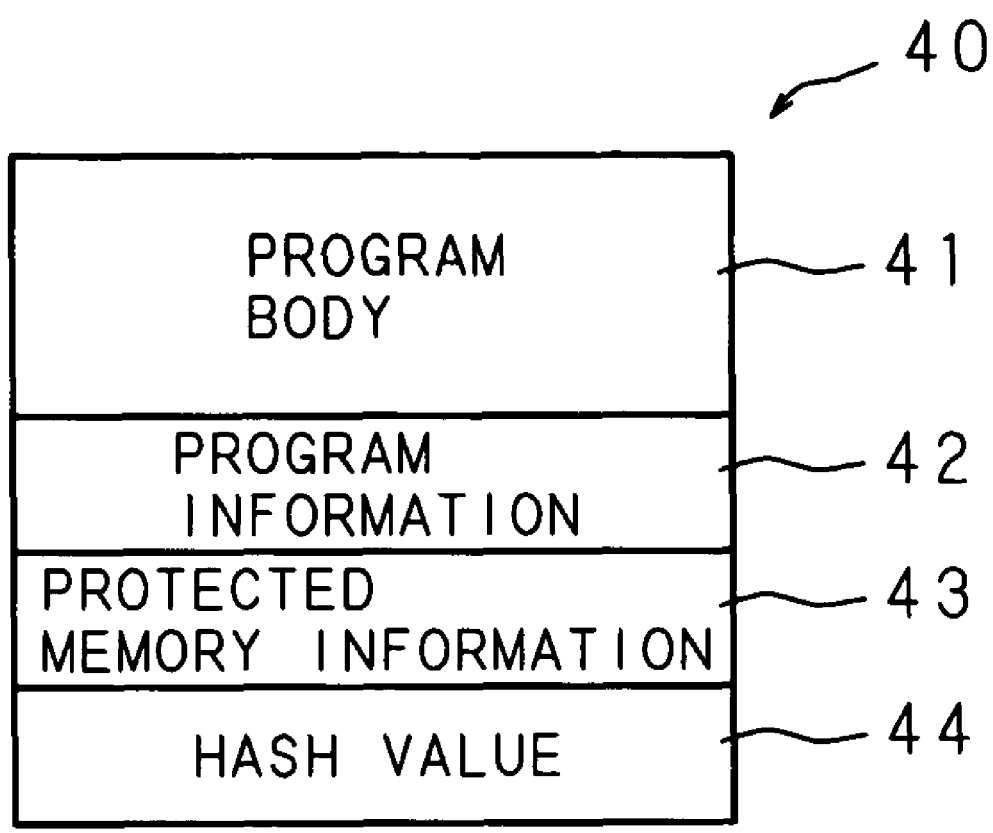

FIG. 3A

PROCESS LIMIT INFORMATION STORING UNIT — 222

| OBJECT | STARTING ADDRESS | ENDING ADDRESS | CONDITION | PROCESS |
|---|---|---|---|---|
| MEMORY | — | — | WRITE | REBOOT |
| MEMORY | — | — | WRITE | INTERRUPTION |
| DMA | — | — | READ | REBOOT |
| ⋮ | ⋮ | ⋮ | ⋮ | ⋮ |

FIG. 3B

PROCESS LIMIT INFORMATION STORING UNIT — 222

| OBJECT | STARTING ADDRESS | SIZE | CONDITION | PROCESS |
|---|---|---|---|---|
| MEMORY | — | — | WRITE | REBOOT |
| DMA | — | — | READ | INTERRUPTION |
| ⋮ | ⋮ | ⋮ | ⋮ | ⋮ | great# INFORMATION PROCESSING APPARATUS, INFORMATION PROCESSING METHOD AND RECORD MEDIUM

CROSS-REFERENCE TO RELATED APPLICATIONS

This Nonprovisional application claims priority under 35 U.S.C. §119(a) on Patent Application No. 2005-146992 filed in Japan on May 19, 2005, the entire contents of which are hereby incorporated by reference.

BACKGROUND OF THE INVENTION

The present invention relates to an information processing apparatus and an information processing method capable of detecting manipulation of a program by a third party. In particular, the present invention relates to an information processing apparatus, an information processing method and a record medium capable of detecting manipulation of an operating system by a third party.

Conventionally, in order to ensure the security of a workstation, a personal computer and the like, authorization is set for a program to be operated, for a user to operate a program and the like, so that operations are authorized only within a range of set authorization. In a method for ensuring the security by setting authorization, an operating system executes authorization setting, monitoring and the like. Accordingly, a normal operation of an operating system is the prerequisite.

As a method for preventing only manipulation of a program, a method is often used for making a memory analysis difficult by arranging a program in a random manner in a memory every time a program is loaded to the memory, for example. In this method, the risk of program manipulation can be decreased by making a memory analysis during execution of a program from another program difficult. Moreover, manipulation of a program can be detected by periodically monitoring a memory in which a program is loaded and stopping execution of the program when a program storage area of the memory is changed.

Moreover, a method has been developed for detecting access violation by separately providing an access monitoring device, which is hardware for detecting access violation of a program, and monitoring a signal outputted to a memory (see Japanese Patent Application Laid-Open No. 2001-325150). In this case, an operating system manages information for identifying a running program, and the access monitoring device, which is hardware, judges whether an access to the memory by a program is unauthorized or not, on the basis of the information for identifying the program.

BRIEF SUMMARY OF THE INVENTION

The present invention has been made in view of such circumstances, and it is an object thereof to provide an information processing apparatus, an information processing method and a record medium, which can prevent occurrence of manipulation of the memory content before execution of a program without consuming the band of a memory access.

Another object of the present invention is to provide an information processing apparatus, an information processing method and a record medium, which can prevent occurrence of manipulation before execution of a program in a case of an access to a memory without consuming the band of a memory access.

In order to achieve the above objects, an information processing apparatus according to the first invention is an information processing apparatus, which comprises a main-processing unit and a sub-processing unit capable of executing a program and a memory for loading a program to be executed, for storing process limit information, which indicates a limitation on a process for a program loaded in the memory, in storing means, characterized in that the sub-processing unit comprises: means for judging whether a program to be executed is manipulated or not; means for loading a program to be executed in the memory when it is judged that the program is not manipulated; means for referring to the process limit information before execution of a program loaded in the memory and judging whether a process by the main-processing unit for a program loaded in the memory accords with a process included in the process limit information or not; and means for not permitting execution of the program by the main-processing unit when said means judges that the processes accord with that.

Moreover, the second invention relates to the information processing apparatus according to the first invention, characterized in that the main-processing unit comprises address control means for controlling read/write for the memory, and the sub-processing unit is constructed to judge whether a process for information stored in an address range designated by the address control means accords with a process included in the process limit information or not.

Moreover, the third invention relates to the information processing apparatus according to the first or second invention, characterized by further comprising means for storing or updating a program to be executed with added information acquirable by only the sub-processing unit when it is judged that said program is not manipulated, in a case of storing or updating said program.

Moreover, an information processing method according to the fourth invention is an information processing method using a computer, which comprises a main-processing unit and a sub-processing unit capable of executing a program and a memory for loading a program to be executed, for storing process limit information, which indicates a limitation on a process for a program loaded in the memory, in storing means, characterized in that the sub-processing unit: judges whether a program to be executed is manipulated or not; loads a program to be executed in the memory when it is judged that the program is not manipulated; refers to the process limit information before execution of a program loaded in the memory; judges whether a process by the main-processing unit for a program loaded in the memory accords with a process included in the process limit information or not; and not permits execution of the program by the main-processing unit when it is judged that the processes accord with that.

Moreover, the fifth invention relates to the information processing method according to the fourth invention, characterized in that the main-processing unit controls read/write for the memory, and the sub-processing unit judges whether a process for information stored in an address range designated by the main-processing unit accords with a process included in the process limit information or not.

Moreover, the sixth invention relates to the information processing method according to the fourth or fifth invention, characterized in that a program to be executed is stored or updated with added information acquirable by only the sub-processing unit when it is judged that said program is not manipulated, in a case of storing or updating said program.

Moreover, a record medium according to the seventh invention is a record medium storing an executable computer program for a computer, which comprises a main-processing unit and a sub-processing unit capable of executing a program and a memory for loading a program to be executed, for storing process limit information, which indicates a limitation on a process for a program loaded in the memory, in storing means, characterized in that the computer program causes the sub-processing unit to function as: means for judging whether a program to be executed is manipulated or not; means for loading a program to be executed in the memory when it is judged that the program is not manipulated; means for referring to the process limit information before execution of a program loaded in the memory and judging whether a process by the main-processing unit for a program loaded in the memory accords with a process included in the process limit information or not; and means for not permitting execution of the program of the main-processing unit when said means judges that the processes accord with that.

Moreover, the eighth invention relates to the record medium according to the seventh invention, characterized in that the computer program causes the main-processing unit to function as address control means for controlling read/write for the memory, and causes the sub-processing unit to function as means for judging whether a process for information stored in an address range designated by the address control means accords with a process stored in the process limit information or not.

Moreover, the ninth invention relates to the record medium according to the seventh or eighth invention, characterized in that the computer program causes the sub-processing unit to function as means for storing or updating a program to be executed with added information acquirable by only the sub-processing unit when it is judged that said program is not manipulated, in a case of storing or updating said program.

In the first invention, the fourth invention and the seventh invention, a computer which comprises a main-processing unit and a sub-processing unit capable of executing a program and stores process limit information that indicates a limitation on a process for information stored in a memory is used, and the sub-processing unit judges whether a program to be executed is manipulated or not and loads a program to be executed in the memory when it is judged that the program is not manipulated. The sub-processing unit refers to the stored process limit information before execution of a program loaded in the memory to judge whether a process by the main-processing unit for a program loaded in the memory accords with a process included in the process limit information or not, and not permits execution of the program of the main-processing unit when it is judged that the processes accord with that. Thus, since the sub-processing unit which is provided separately from the main-processing unit for executing a program judges occurrence of manipulation of a program, it is possible to ascertain manipulation of a program out of management of the operating system. That is, since process limit information is set before the operating system is operated, it becomes possible to prevent occurrence of manipulation of the operating system. Furthermore, since presence of a program execution inhibiting process based on process limit information is ascertained every time a program is executed, it is needless to execute memory monitoring periodically at regular intervals and it becomes possible to utilize a computer resource effectively without consuming band for the access to the memory. It should be noted that a "program" in the present specification is a concept including not only an executable program such as a load module but also data which can be read and written by the executable program.

In the second invention, the fifth invention and the eighth invention, the main-processing unit controls an address of the memory, and the sub-processing unit judges whether a process for information stored in an address range dynamically designated accords with a process included in the process limit information or not. Thus, since the sub-processing unit judges whether a process for a memory area allocated by a DMA accords with a process included in the process limit information or not, it is possible to judge presence of program manipulation out of management of an operating system. That is, since process limit information is set before the operating system is operated, it is possible to ascertain whether the operating system has been manipulated or not. Accordingly, it becomes possible to prevent occurrence of an unauthorized access by manipulation of an operating system.

In the third invention, the sixth invention and the ninth invention, a program to be executed is stored or updated with added information acquirable by only the sub-processing unit when it is judged that said program is not manipulated, in a case of storing or updating said program. Thus, it is possible to reliably ascertain manipulation during memory loading of a program to be executed, and further enhancement of the security of program execution can be expected.

With the first invention, the fourth invention and the seventh invention, since the sub-processing unit which is provided separately from the main-processing unit for executing a program judges occurrence of manipulation of a program, it is possible to ascertain manipulation of a program out of management of the operating system. That is, since process limit information is set before the operating system is operated, it becomes possible to prevent occurrence of manipulation of the operating system. Furthermore, since presence of a program execution inhibiting process based on process limit information is ascertained every time a program is executed, it is needless to execute memory monitoring periodically at regular intervals and it becomes possible to utilize a computer resource effectively without consuming the band for access to the memory.

With the second invention, the fifth invention and the eighth invention, since the sub-processing unit judges whether a process for a memory area allocated by a DMA accords with a process included in the process limit information or not, it is possible to judge occurrence of program manipulation out of management of an operating system. That is, since process limit information is set before the operating system is operated, it is possible to ascertain whether the operating system has been manipulated or not. Accordingly, it becomes possible to prevent occurrence of an unauthorized access by manipulation of an operating system.

With the third invention, the sixth invention and the ninth invention, since a program to be executed is stored or updated with added information acquirable by only the sub-processing unit, in a case of storing or updating said program so that it can be judged that said program is not manipulated, it is possible to reliably ascertain manipulation during memory loading of a program to be executed, and further enhancement of the security of program execution can be expected.

The above and further objects and features of the invention will more fully be apparent from the following detailed description with accompanying drawings.

BRIEF DESCRIPTION OF THE SEVERAL VIEWS OF THE DRAWINGS

FIG. 2 is an illustration of the structure of a program to be executed;

FIG. 3 is a view showing an example of the data structure of data stored in a process limit information storing unit;

DETAILED DESCRIPTION OF THE INVENTION

An operating system for monitoring authorization of a program is one of programs, and it is able to update an authorization setting method, a monitoring method and the like with an operating system such as Linux which can also update a kernel module. Accordingly, there is a problem that there remains a possibility of nullification of authorization monitoring and an unauthorized memory access by manipulation of the operating system itself.

Moreover, in a method for making a memory analysis difficult by arranging a program in a random manner in a memory, the shorter the monitoring interval of the memory content is, the sooner manipulation of a program can be found. However, shortening of the monitoring interval contributes to performance deterioration due to use of the band of a memory access by the monitoring program. Furthermore, there is a problem that only a state after a program is manipulated can be detected however short the monitoring interval becomes, and it is impossible to prevent occurrence of manipulation.

Furthermore, in a method for separately providing an access monitoring apparatus which is hardware for detecting access violation of a program, since an operating system manages information for identifying a running program there is a problem that there remains a possibility of control of the operation of the access monitoring apparatus when the operating system itself is manipulated.

The present invention has been made in view of such circumstances, and it is an object thereof to provide an information processing apparatus, an information processing method and a record medium, which can prevent occurrence of manipulation of memory content before execution of a program without consuming the band of a memory access.

Another object of the present invention is to provide an information processing apparatus, an information processing method and a record medium, which can prevent occurrence of manipulation before execution of a program, in a case of an access to a memory without consuming the band of a memory access, and the invention is realized by the following embodiments.

Embodiment 1

Figure 1:
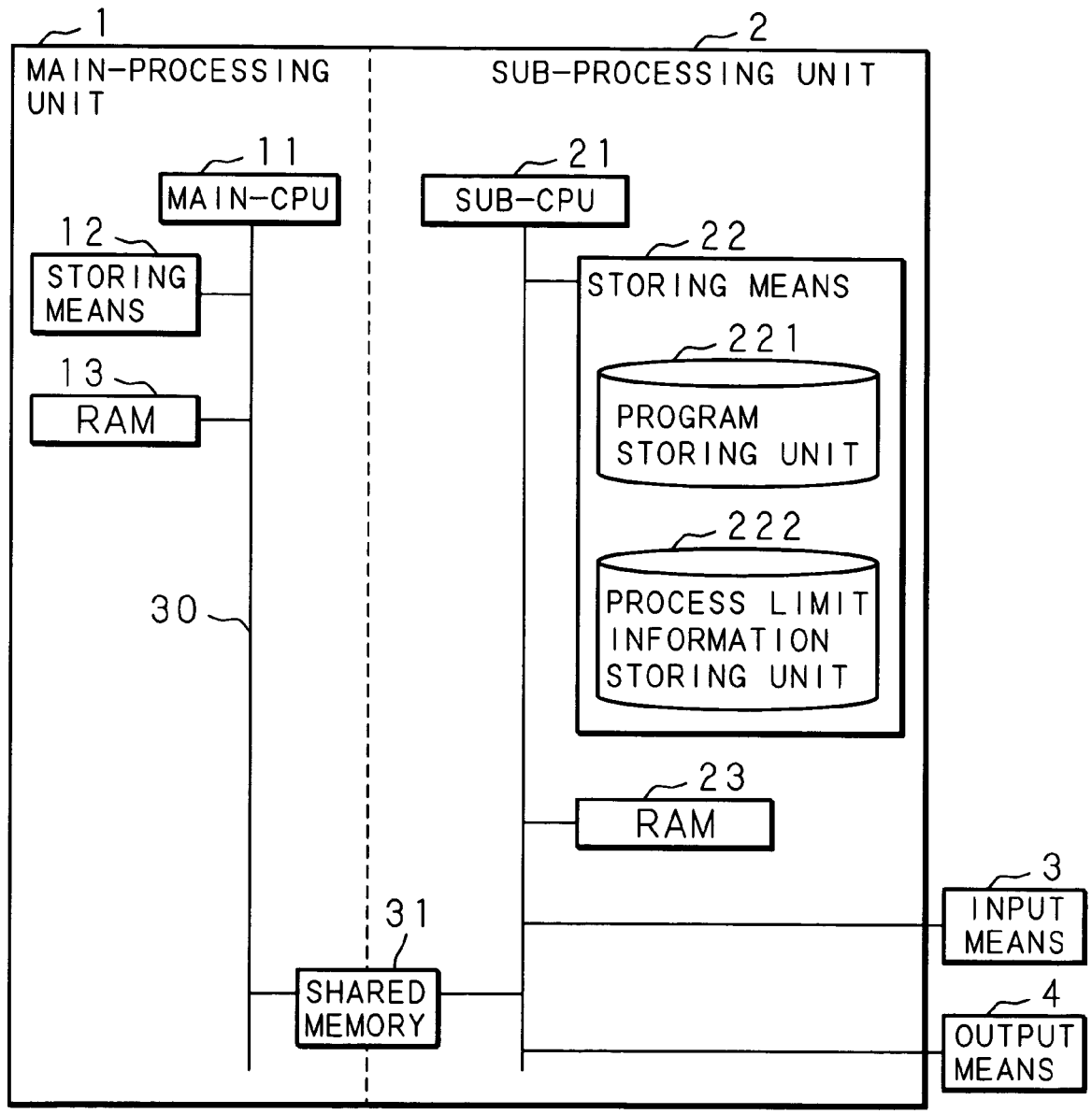
FIG. 1 is a block diagram showing the structure of an information processing apparatus according to Embodiment 1 of the present invention.

FIG. 1 is a block diagram showing the structure of an information processing apparatus according to Embodiment 1 of the present invention. The information processing apparatus according to Embodiment 1 comprises a main-processing unit 1 and a sub-processing unit 2 in a same housing, and the main-processing unit 1 and the sub-processing unit 2 are connected with each other so as to be able to transmit and receive data via an internal bus 30.

The main-processing unit 1 and the sub-processing unit 2 are also connected with input means 3 and output means 4 via the internal bus 30.

The main-processing unit 1 at least comprises a main-CPU 11, storing means 12, a RAM 13 and a shared memory 31 data of which can be read and written also from the sub-processing unit 2, and the storing means 12 stores a program for which it is needless to detect manipulation by the sub-processing unit 2.

The main-CPU 11 is connected with the respective hardware units mentioned above of the main-processing unit 1 via the internal bus 30, and executes a variety of software functions by controlling the respective hardware units mentioned above and loading a program stored in the storing means 12 such as a hard disk, e.g. a program for controlling access to the shared memory 31, in the RAM 13.

The RAM 13, which is constituted of a DRAM or the like, loads a program stored in the storing means 12, e.g. a program for controlling access to the shared memory 31, in execution and stores temporary data generated during execution. Moreover, the shared memory 31 can be also accessed from the sub-processing unit 2 via the internal bus 30, and the main-CPU 11 executes a program loaded in the shared memory 31, e.g. an operating system.

The sub-processing unit 2 at least comprises a sub-CPU 21, storing means 22, a RAM 23 and the shared memory 31 data of which can be read and written from the main-processing unit 1, and the storing means 22 comprises a program storing unit 221 for storing programs such as an operating system and a control program and a process limit information storing unit 222 for storing limit information of a process for the shared memory 31.

The sub-CPU 21 is connected with the respective hardware units mentioned above of the sub-processing unit 2 via the internal bus 30 and executes a variety of software functions by controlling the respective hardware units mentioned above and loading various kinds of programs stored in the program storing unit 221 such as a hard disk to the RAM 23. The sub-CPU 21 also judges presence of the possibility of manipulation before execution of a program loaded in the shared memory 31, on the basis of the limit information of a process for the shared memory 31 stored in the process limit information storing unit 222.

The input means 3 is an input medium such as a mouse or a keyboard comprising letter keys, ten keys, various kinds of functions keys and the like necessary for manipulating the information processing apparatus. The output means 4 is a display device such as a liquid crystal display or a CRT display, a printer such as a laser printer or a dot printer, or the like.

The following description will explain the processes of the main-processing unit 1 and the sub-processing unit 2 in the information processing apparatus constructed as described above. When the information processing apparatus is switched on or reset, the sub-CPU 21 reads a program to be executed from the program storing unit 221 of the storing means 22 and loads the program in the shared memory 31. FIG. 2 is an illustration of the structure of a program to be executed.

A program 40 to be executed in the present Embodiment 1 includes, in addition to a program body 41: program information 42, which stores a loading method of the program 40, a starting address and the like; protected memory information 43 which designates a memory area to be protected by limiting a process from outside; and hash information 44 to be used for detecting manipulation, so that whether the program 40 has been manipulated or not can be ascertained. A hash value to be set in the hash information 44 may be a hash value for the entire program 40 or a hash value for the program body 41.

The program 40 may be encrypted with key information which can be decrypted, or only the program body 41 may be encrypted with key information which can be decrypted. In this case, whether the program is manipulated or not may be judged by calculating a hash value after decryption, or whether the program is manipulated or not may be judged by calculating a hash value before decryption and then decryption may be performed.

The sub-CPU 21 reads the protected memory information 43 from the program 40 and stores the information in the process limit information storing unit 222. FIG. 3 is a view showing an example of the data structure of data stored in the process limit information storing unit 222. FIG. 3A shows the data structure of a case where a memory area to be protected is designated with a starting address and an ending address while FIG. 3B shows the data structure of a case where a memory area to be protected is designated with a starting address and an area size. As shown in FIG. 3, an object to be protected, a condition for limiting a process and a process to be executed by the sub-CPU 21 for limiting a process are stored in relation to a memory area.

In the example of FIG. 3, a memory or a DMA can be designated as the object to be protected and a memory area to be protected is designated for each. Read, write and read/write can be designated as a condition for limiting a process, and a process which can stop execution of a program is executed when read from a designated memory area and/or write into a designated memory area is detected.

Reboot and interruption processes for the main-CPU 11 are designated as processes which can stop execution of a program. The former is a process of restarting the information processing apparatus so as to prevent occurrence of read from or write to a memory area to be protected. The latter is an interruption process for stopping execution of a program by the main-CPU 11.

Figure 4:
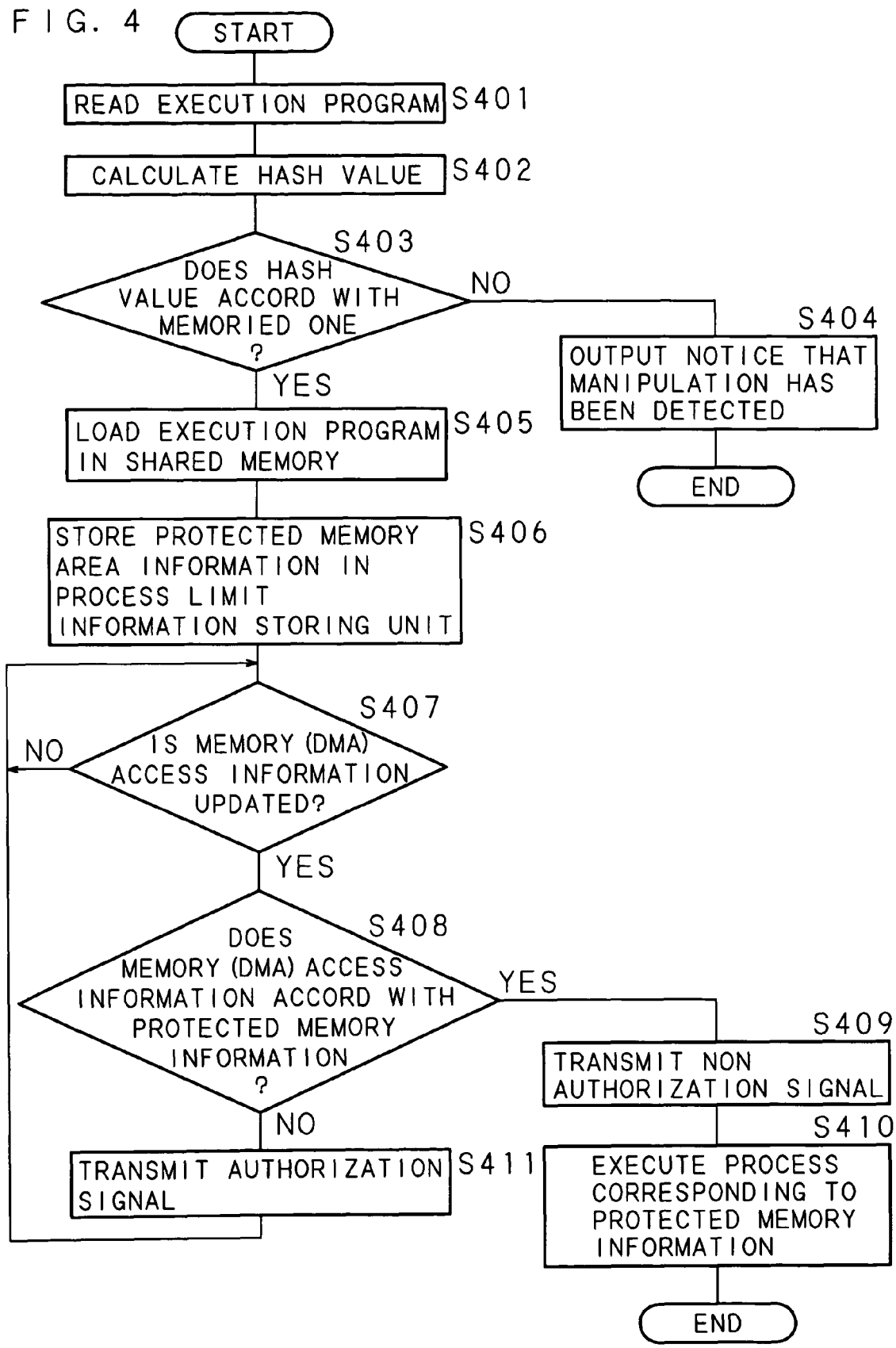
FIG. 4 is a flowchart showing the process procedure of a sub-CPU of a sub-processing unit in the information processing apparatus according to Embodiment 1 of the present invention.

FIG. 4 is a flowchart showing the process procedure of the sub-CPU 21 of the sub-processing unit 2 in the information processing apparatus according to Embodiment 1 of the present invention. The sub-CPU 21 of the sub-processing unit 2 reads a program to be executed from the program storing unit 221 (step S401) and calculates a hash value of the read program (step S402).

The sub-CPU 21 judges whether the calculated hash value accords with a hash value of a program to be executed which is stored in the storing means 22 or not (step S403), and when the sub-CPU 21 judges that the hash value does not accord with that (step S403: NO), the sub-CPU 21 judges that some manipulation has been performed for the program to be executed and outputs a notice that manipulation has been detected to the outside without loading the program in the shared memory 31 (step S404). In particular, to be outputted is display of a warning message to a display unit, print of a warning message to a printer or the like.

When the sub-CPU 21 judges that the hash value accords with that (step S403: YES), the sub-CPU 21 judges that the program is not manipulated, loads the program to be executed in the shared memory 31 (step S405) and stores protected memory information included in the loaded program in the process limit information storing unit 222 (step S406). The sub-CPU 21 judges whether memory (DMA) access information stored in the shared memory 31 has been updated or not (step S407). It should be noted that the memory (DMA) access information is information on the distinction between read and write of the shared memory 31 and on an address of read/write for each command included in a program to be executed by the main-CPU 11.

The sub-CPU 21 is in the wait state until the memory (DMA) access information is updated (step S407: NO), and when the sub-CPU 21 judges that the memory (DAM) access information has been updated (step S407: YES), the sub-CPU 21 judges whether the memory (DMA) access information stored in the shared memory 31 accords with protected memory information stored in the process limit information storing unit 222 or not (step S408). When the sub-CPU 21 judges that the information accords with that (step S408: YES), the sub-CPU 21 judges that a command extracted by the main-CPU 11 is an unauthorized update process, e.g. a command for manipulation, transmits a non authorization signal which does not authorize the main-CPU 11 to execute the program (step S409) and then executes a process corresponding to the protected memory information extracted from the process limit information storing unit 222 without causing the main-CPU 11 to execute the extracted command (step S410). For example, to be performed is rebooting or erasing of a program to be executed which is loaded in the shared memory 31 by the interruption process.

When the sub-CPU 21 judges that the information does not accord with that (step S408: NO), the sub-CPU 21 judges that the command does not execute an unauthorized process, transmits an authorization signal which authorizes the main-CPU 11 to execute the program (step S411), then goes back to the step S407 and repeats the process described above.

Figure 5:
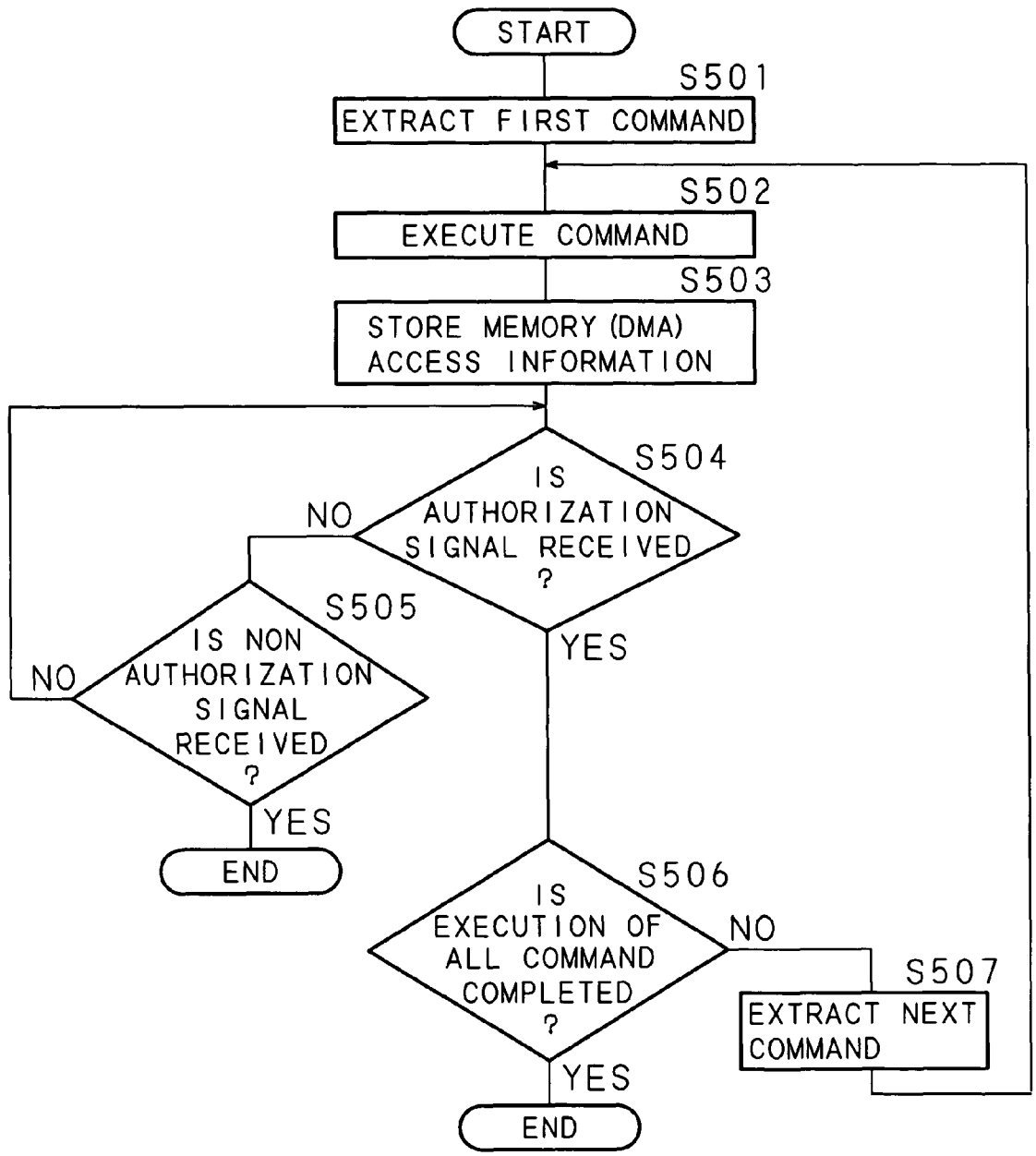
FIG. 5 is a flowchart showing the process procedure of a main-CPU of a main-processing unit in the information processing apparatus according to Embodiment 1 of the present invention.

The update process of the memory (DMA) access information is executed by the main-CPU 11. FIG. 5 is a flowchart showing the process procedure of the main-CPU 11 of the main-processing unit 1 in the information processing apparatus according to Embodiment 1 of the present invention. It should be noted that it is assumed that read of a command is correctly executed although read/write of a command itself to be executed by the CPU in the memory occurs, for the sake of simplicity. The main-CPU 11 of the main-processing unit 1 extracts the first command from a program to be executed which is loaded in the shared memory 31 (step S501) and executes the extracted command (step S502). When read/write for the shared memory 31 occurs by execution of the command, the main-CPU 11 stores the distinction between read and write and an address of read/write as the memory (DMA) access information (step S503).

The main-CPU 11 judges whether an authorization signal has been received from the sub-CPU 21 or not (step S504), and when the main-CPU 11 judges that no authorization signal has been received (step S504: NO), the main-CPU 11 judges whether a non authorization signal has been received or not (step S505). When the main-CPU 11 judges that a non authorization signal has been received (step S505: YES), the main-CPU 11 terminates the process for the program. When the main-CPU 11 judges that no non authorization signal has been received (step S505: NO), the main-CPU 11 returns the process to the step S504. It should be noted that, when execution of the command is not authorized, the information processing apparatus is rebooted by the sub-CPU 21, or an interruption occurs for the main-CPU 11 and the process of the program is terminated by the main-CPU 11.

When the main-CPU 11 judges that an authorization signal for the extracted command has been received (step S504: YES), the main-CPU 11 judges whether execution of all commands has been completed or not (step S506), and when the main-CPU 11 judges that execution of all commands has been completed (step S506: YES), the main-CPU 11 terminates the process.

When the main-CPU 11 judges that execution of any command has not been completed (step S506: NO), the main-CPU 11 extracts the next command (step S507), goes back to the step S502 and repeats the process described above.

It should be noted that the address control for the shared memory 31 may be static address control or DMA. In a case of control by DMA, the main-processing unit 1 comprises an address control function (address control means) for controlling the address of the shared memory 31 for processing in the main-CPU 11 and uses the address control function to control whether the main-CPU 11 executes a program or not depending on whether a process for a program stored in an address range designated by the main-CPU 11 accords with the process limit information stored in the process limit information storing unit 222 or not.

Moreover, in a case of storing a program in the program storing unit 221, it is preferable to convert a program at the sub-processing unit 2 into a form which does not permit manipulation after authentication. This is because it is therefore possible to ensure that manipulation is not performed after authentication.

The authentication method of a program may be decryption with a public key, hash or the like, although the method is not limited especially to these. It will be assumed hereinafter that a program to be stored is encrypted with a secret key after calculating hash and the sub-processing unit 2 stores a public key.

The sub-processing unit 2 decrypts a program in an encrypted state with the public key. The sub-processing unit 2 calculates hash for the decrypted program and compares the hash with a stored hash value. When the hash values are different, it is judged that manipulation has been performed and the process is terminated without storing the program.

It should be noted that, when the program size is large and the process is split, the decryption process and the hash calculating process are performed repeatedly. In this case, the hash value is stored in the RAM 23 in the sub-processing unit 2 and used for the next process.

The decrypted program data is preferably stored in the sub-processing unit 2. However, a memory can be used as a temporary region. In this case, an access to the temporary region from the main-processing unit 1 is not permitted while the temporary region can be accessed from the sub-processing unit 2.

When a program is decrypted and the hash values accord with that, the program is encrypted with the key stored in the sub-processing unit 2 and stored in the program storing unit 221. Similarly to the decryption, the process may be split. It should be noted that, for a splitting process, an encryption process may be performed either after the decryption process and the hash calculating process, or after completion of an ascertaining process of manipulation.

With the present Embodiment 1, as described above, since the sub-processing unit 2 which is provided separately from the main-processing unit 1 for executing a program judges occurrence of manipulation of a program, it is possible to ascertain manipulation of a program out of management of the operating system. Moreover, since whether the operating system has been manipulated or not can be ascertained before activating the operating system, for example, it also becomes possible to prevent occurrence of an unauthorized access by manipulation of the operating system. Furthermore, presence of a program execution inhibiting process based on process limit information can be ascertained every time a program is executed, it is needless to execute memory monitoring periodically at regular intervals and it becomes possible to utilize a computer resource effectively without consuming the band for access to the memory.

Embodiment 2

Figure 6:
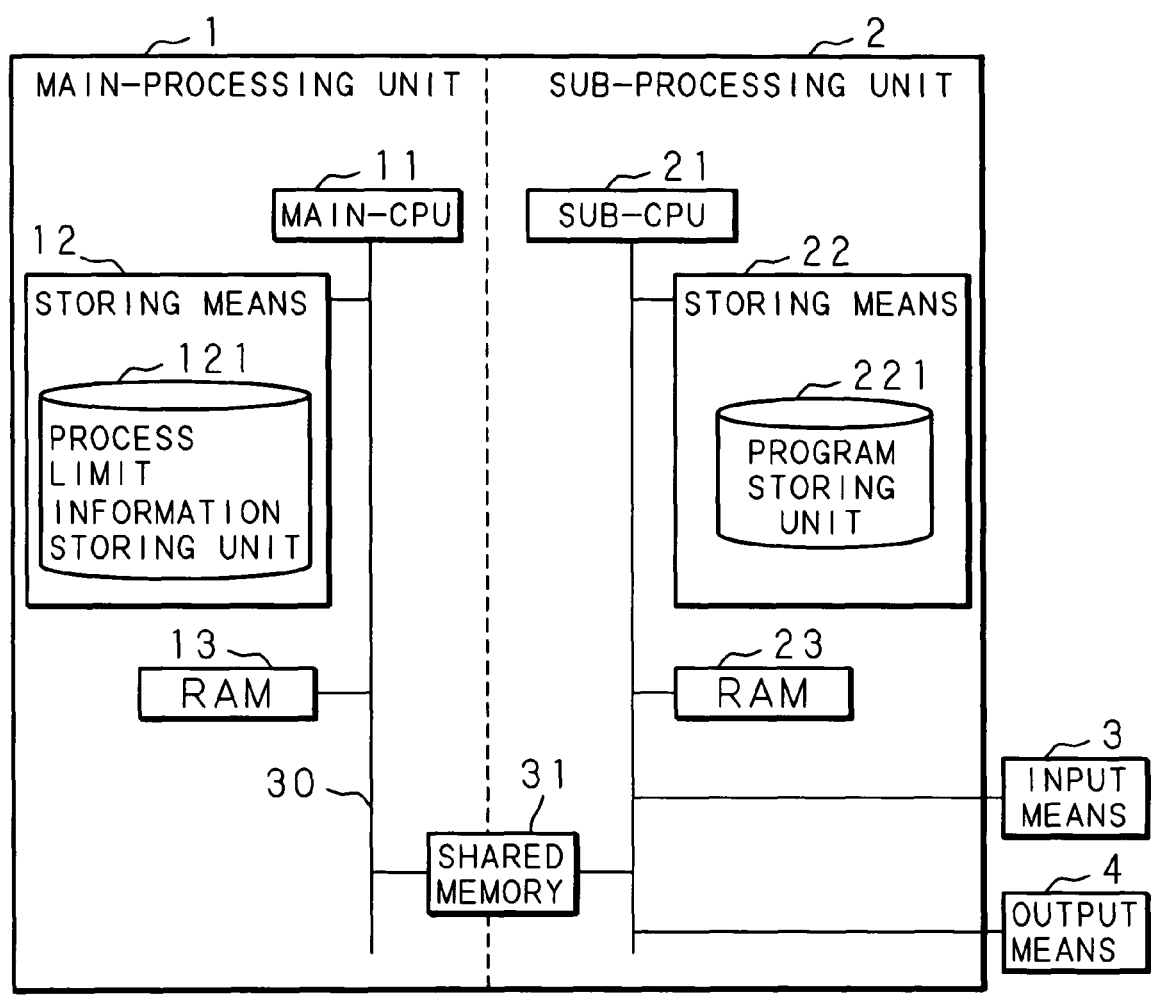
FIG. 6 is a block diagram showing the structure of an information processing apparatus according to Embodiment 2 of the present invention.

Regarding FIG. 6, the structure of an information processing apparatus according to the present Embodiment 2 is the same as that of Embodiment 1. Accordingly, like codes are used to refer to components having like functions and detailed explanation will be omitted. The present Embodiment 2 is different from Embodiment 1 in that the process limit information storing unit for storing process limit information is provided at the main-processing unit 1.

That is, the storing means 12 of the main-processing unit 1 comprises a process limit information storing unit 121 which stores process limit information, in addition to various kinds of control programs.

The following description will explain the processes of the main-processing unit 1 and the sub-processing unit 2 in the information processing apparatus constructed as described above. When the information processing apparatus is switched on or reset, the sub-CPU 21 reads a program to be executed from the program storing unit 221 of the storing means 22 and loads the program in the shared memory 31.

The sub-CPU 21 reads the protected memory information 43 from the program 40 and transmits the information to the main-CPU 11. The main-CPU 11 stores the received protected memory information 43 in the process limit information storing unit 121. The data structure of the data to be stored in the process limit information storing unit 121 is the same as that of Embodiment 1.

Figure 7:
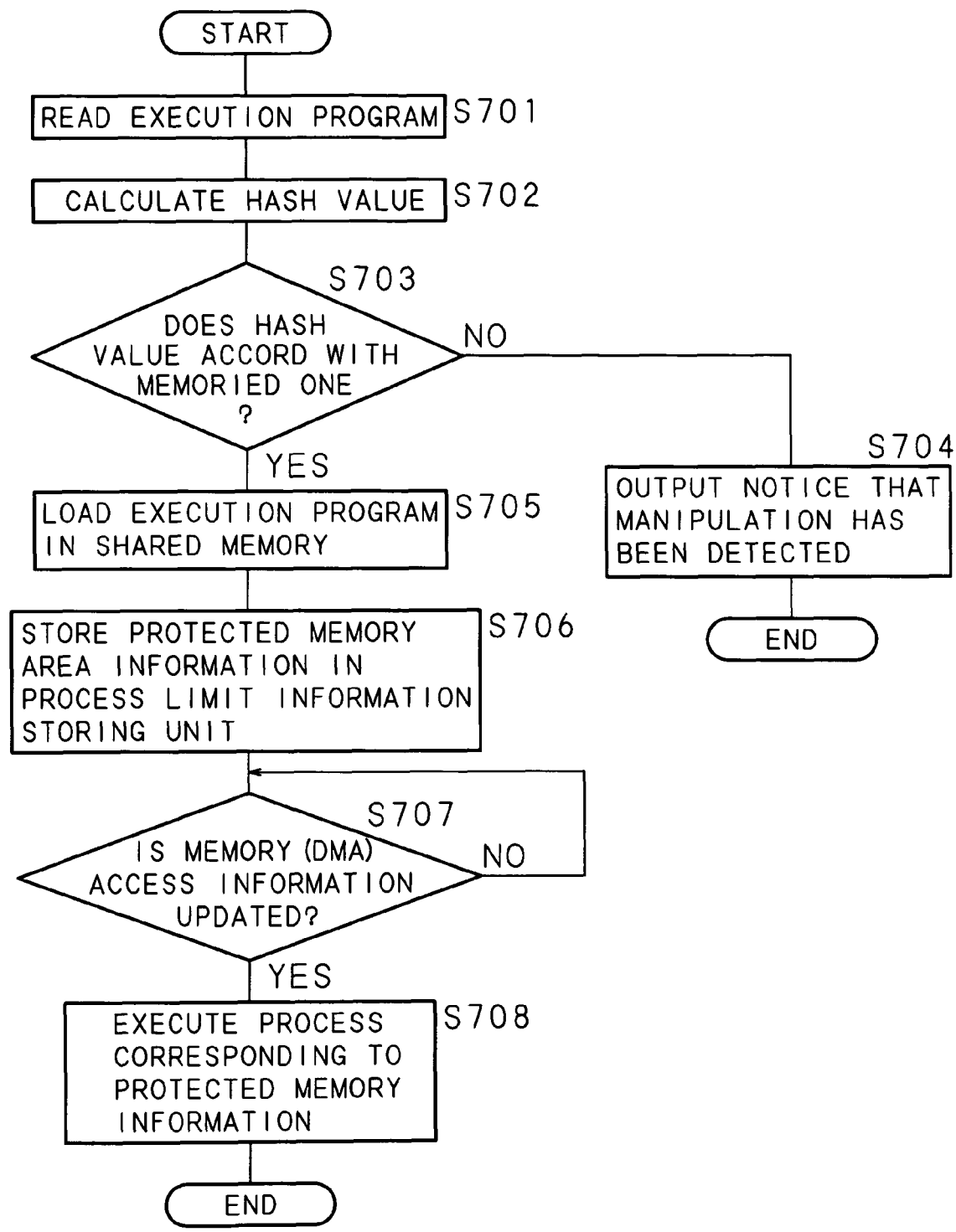
FIG. 7 is a flowchart showing the process procedure of a sub-CPU of a sub-processing unit in the information processing apparatus according to Embodiment 2 of the present invention.

FIG. 7 is a flowchart showing the process procedure of the sub-CPU 21 of the sub-processing unit 2 in the information processing apparatus according to Embodiment 2 of the present invention. The sub-CPU 21 of the sub-processing unit 2 reads a program to be executed from the program storing unit 221 (step S701) and calculates a hash value of the read program (step S702).

The sub-CPU 21 judges whether the calculated hash value accords with a hash value of a program to be executed which is stored in the storing means 22 or not (step S703), and when the sub-CPU 21 judges that the hash value does not accord with that (step S703: NO), the sub-CPU 21 judges that some manipulation has been performed for the program to be executed and outputs a notice that manipulation has been detected to the outside without loading the program in the shared memory 31 (step S704). In particular, to be outputted is display of a warning message to a display unit, print of a warning message to a printer or the like.

When the sub-CPU 21 judges that the hash values accord with that (step S703: YES), the sub-CPU 21 loads the program to be executed in the shared memory 31 (step S705) and stores protected memory information included in the loaded program in the process limit information storing unit 121 (step S706). The sub-CPU 21 judges whether memory (DMA) access information stored in the shared memory 31 has been updated or not (step S707). It should be noted that the memory (DMA) access information is information to be stored when access violation to a memory area to be protected occurs and information on the distinction between read and write of the memory, an address of read/write and a process to be performed at the time of violation.

The sub-CPU 21 is in the wait state until the memory (DMA) access information is updated (step S707: NO), and when the sub-CPU 21 judges that the memory (DAM) access information has been updated (step S707: YES), the sub-CPU 21 executes a process corresponding to the protected memory information included in the memory (DMA) access information (step S708).

Figure 8:
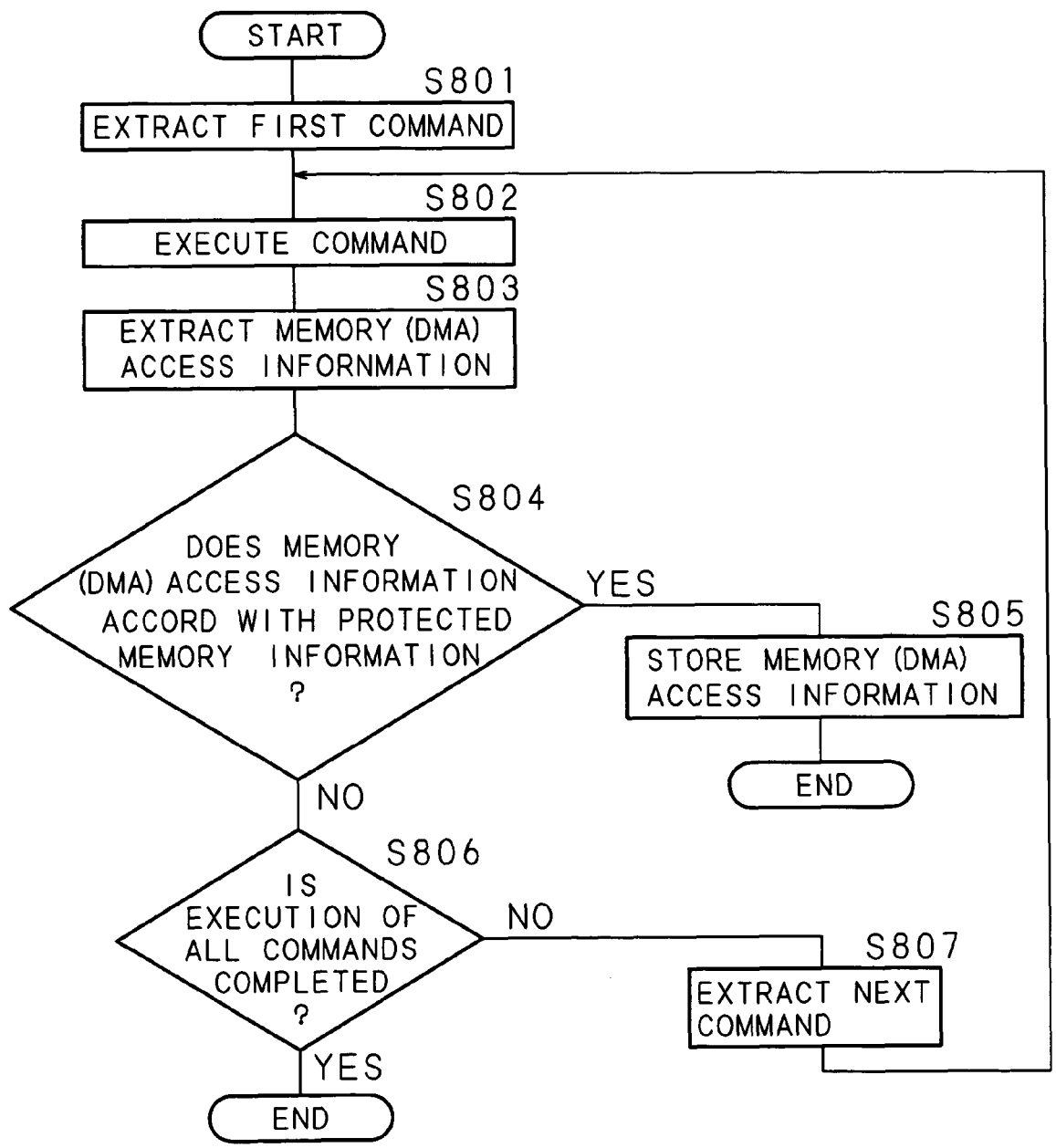
FIG. 8 is a flowchart showing the process procedure of a main-CPU of a main-processing unit in the information processing apparatus according to Embodiment 2 of the present invention.

The update process of the memory (DMA) access information is executed by the main-CPU 11. FIG. 8 is a flowchart showing the process procedure of the main-CPU 11 of the main-processing unit 1 in the information processing apparatus according to Embodiment 2 of the present invention. The main-CPU 11 of the main-processing unit 1 extracts the first command from a program to be executed which is loaded in the shared memory 31 (step S801) and executes the extracted command (step S802).

When read/write for the shared memory 31 occurs, the main-CPU 11 extracts memory (DMA) access information (step S803) and judges whether the information accords with protected memory information stored in the process limit information storing unit 121 or not (step S804). When the main-CPU 11 judges that the information accords with that (step S804: YES), the main-CPU 11 judges that the extracted command is a command for performing an unauthorized update process, e.g. manipulation, and stores the information including a process corresponding to the protected memory information extracted from the process limit information storing unit 121 as memory (DMA) access information without executing the extracted command (step S805).

When the main-CPU 11 judges that the information does not accord with that (step S804: NO), the main-CPU 11 judges that the command does not execute an unauthorized process and judges whether execution of all commands included in the program to be executed has been completed or not (step S806).

When the main-CPU 11 judges that execution of any command has not been completed (step S806: NO), the main-CPU 11 extracts the next command (step S807), goes back to the step S802 and repeats the process described above. When the main-CPU 11 judges that execution of all commands has been completed (step S806: YES), the main-CPU 11 terminates the process.

It should be noted that, similarly to Embodiment 1, the address control for the shared memory 31 may be static address control or DMA. In a case of control by DMA, the main-processing unit 1 comprises an address control function (address control means) for controlling the address of the shared memory 31 for processing in the main-CPU 11 and uses the address control function to control whether the main-CPU 11 executes a program or not depending on whether a process for a program stored in an address range designated by the main-CPU 11 accords with the process limit information stored in the process limit information storing unit 121 or not.

Moreover, similarly to Embodiment 1, in a case of storing a program in the program storing unit 221, it is preferable to convert a program at the sub-processing unit 2 into a form which does not permit manipulation after authentication. This is because it ensures that manipulation is not performed after authentication.

The authentication method of a program may be decryption with a public key, hash or the like, although the method is not limited especially to these. It will be assumed hereinafter that a program to be stored is encrypted with a secret key after calculating a hash value and the sub-processing unit 2 stores a public key.

The sub-processing unit 2 decrypts a program in an encrypted state with the public key. The sub-processing unit 2 calculates hash for the decrypted program and compares the hash with a stored hash value. When the hash values are different, it is judged that manipulation has been performed and the process is terminated without storing the program.

It should be noted that, when the program size is large and the process is split, the decryption process and the hash calculating process are performed repeatedly. In this case, the hash value is stored in the RAM 23 in the sub-processing unit 2 and used for the next process.

The decrypted program data is preferably stored in the sub-processing unit 2. However, a memory can be used as a temporary region. In this case, an access to the temporary region from the main-processing unit 1 is not permitted while the temporary region can be accessed from the sub-processing unit 2.

When a program is decrypted and the hash values accord with that, the program is encrypted with the key stored in the sub-processing unit 2 and stored in the program storing unit 221. Similarly to the decryption, the process may be split. It should be noted that, for a splitting process, an encryption process may be performed either after the decryption process and the hash calculating process, or after completion of an ascertaining process of manipulation.

With the present Embodiment 2, as described above, since the sub-processing unit 2 which is provided separately from the main-processing unit 1 for executing a program judges occurrence of manipulation of a program, it is possible to ascertain manipulation of a program out of management of the operating system. Moreover, since whether the operating system has been manipulated or not can be ascertained before activating the operating system, it also becomes possible to prevent occurrence of an unauthorized access by manipulation of the operating system. Furthermore, presence of a program execution inhibiting process based on process limit information can be ascertained every time a program is executed, it is needless to execute memory monitoring periodically at regular intervals and it becomes possible to utilize a computer resource effectively without consuming the band for access to the memory.

It should be noted that, although a method for reading an address range to be stored in the process limit information from the program 40 and storing the address range has been explained in the present embodiment, the present invention is not limited to this and a frequently-executed program may be stored in advance.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An information processing apparatus comprising:
   a main-processing unit and a sub-processing unit capable of executing a program;
   a memory for loading a program to be executed; and
   storing means for storing process limit information which indicates a limitation on a process for the program loaded in the memory, wherein the sub-processing unit comprises:
   means for judging whether the program to be executed is manipulated or not;
   means for loading the program to be executed in the memory when it is judged that the program is not manipulated;

means for referring to the process limit information before execution of the program loaded in the memory when a memory-access by the main processing unit is performed, and judging whether a memory-access by the main-processing unit for the program loaded in the memory accords with a condition included in the process limit information or not; and means for not permitting execution of the program of the main-processing unit when said means judges that the memory-access by the main-processing unit for the program loaded in the memory accords with the condition included in the process limit information.

2. The information processing apparatus according to claim 1, wherein the main-processing unit comprises address control means for controlling read/write for the memory, and the sub-processing unit judges whether a process for information stored in an address range designated by the address control means accords with the condition included in the process limit information or not.

3. The information processing apparatus according to claim 1, further comprising means for storing or updating the program to be executed with added information acquirable by only the sub-processing unit when it is judged that said program is not manipulated.

4. The information processing apparatus according to claim 2, further comprising means for storing or updating the program to be executed with added information acquirable by only the sub-processing unit when it is judged that said program is not manipulated.

5. An information processing apparatus comprising: a main-processing unit and a sub-processing unit capable of executing a program;

a memory for loading a program to be executed; and storing means for storing process limit information which indicates a limitation on a process for the program loaded in the memory, wherein the sub-processing unit is capable of performing the operations of:

judging whether the program to be executed is manipulated or not;

loading the program to be executed in the memory when it is judged that the program is not manipulated;

referring to the process limit information before execution of the program loaded in the memory and judging whether a memory-access by the main-processing unit for the program loaded in the memory accords with a condition included in the process limit information or not; and not permitting execution of the program of the main-processing unit when it is judged that the memory-access by the main-processing unit for the program loaded in the memory accords with the condition included in the process limit information.

6. The information processing apparatus according to claim 5, wherein the main-processing unit is further capable of performing the operation of designating an address range of read/write for the memory, and the sub-processing unit is further capable of performing the operation of judging whether a process for information stored in the designated address range accords with the condition included in the process limit information or not.

7. The information processing apparatus according to claim 5, wherein the main-processing unit or the sub-processing unit is further capable of performing the operation of storing or updating the program to be executed with added information acquirable by only the sub-processing unit when it is judged that said program is not manipulated.

8. The information processing apparatus according to claim 6, wherein the main-processing unit or the sub-processing unit is further capable of performing the operation of storing or updating the program to be executed with added information acquirable by only the sub-processing unit when it is judged that said program is not manipulated.

9. An information processing method, comprising the steps of:

By using the sub-processing unit, judging whether a program to be executed is manipulated or not;

loading the program to be executed in a memory when it is judged that the program is not manipulated;

referring to process limit information which indicates a limitation on a process for the program loaded in the memory before execution of the program and judging whether a memory-access by main-processing unit for the program loaded in the memory accords with a condition included in the process limit information or not; and not permitting execution of the program of the main processing unit when it is judged that the memory-access by the main-processing unit for the program loaded in the memory accords with the condition included in the process limit information.

10. The information processing method according to claim 9, comprising the further steps of:

by using the main-processing unit, designating an address range of read/write for the memory, and by using the sub-processing unit, judging whether a process for information stored in the designated address range accords with the condition included in the process limit information or not.

11. The information processing method according to claim 9, comprising the further step of storing or updating the program to be executed with added information acquirable by only the sub-processing unit when it is judged that said program is not manipulated.

12. The information processing method according to claim 10, comprising the further step of storing or updating the program to be executed with added information acquirable by only the sub-processing unit when it is judged that said program is not manipulated.

13. A non-transitory computer-readable medium storing a computer program for a computer, the computer program comprising the steps of:

causing a sub-processing unit to judge whether a program to be executed is manipulated or not;

causing the sub-processing unit to load the program to be executed in a memory when it is judged that the program is not manipulated;

causing the sub-processing unit to refer to process limit information which indicates a limitation on a process for the program loaded in the memory before execution of the program and judge whether a process by a main-processing unit for the program, loaded in the memory accords with a predetermined process included in the process limit information or not; and causing the sub-processing unit not to permit execution of the program of the main-processing unit when it is judged that the process by the main-processing unit for the program loaded in the memory accords with the predetermined process included in the process limit information, wherein the predetermined process included in the process limit information indicates at least a reboot or interruption process.

14. The record medium according to claim 13, comprising the further steps of:
    causing the main-processing unit to designate an address range of read/write for the memory; and
    causing the sub-processing unit to judge whether a process for information stored in a designated address range accords with the predetermined process included in the process limit information or not.

15. The record medium according to claim 13, comprising the further step of
    causing the sub-processing unit to store or update the program to be executed with added information acquirable by only the sub-processing unit when it is judged that said program is not manipulated, in a case of storing or updating said program.

16. The record medium according to claim 14, comprising the further step of
    causing the sub-processing unit to store or update the program to be executed with added information acquirable by only the sub-processing unit when it is judged that said program is not manipulated, in a case of storing or updating said program.

* * * * *